US012803014B2

(12) United States Patent
Rothgang et al.

(10) Patent No.: US 12,803,014 B2
(45) Date of Patent: Nov. 17, 2026

(54) DEVICE FOR ANODE GAS RECIRCULATION IN A FUEL CELL SYSTEM

(71) Applicant: PIERBURG GMBH, Neuss (DE)

(72) Inventors: Stefan Rothgang, Rheinberg (DE); Andreas Burger, Krefeld (DE); Michael-Thomas Benra, Castrop-Rauxel (DE)

(73) Assignee: PIERBURG GMBH, Neuss (DE)

( * ) Notice: Subject to any disclaimer, the term of this patent is extended or adjusted under 35 U.S.C. 154(b) by 477 days.

(21) Appl. No.: 18/579,869

(22) PCT Filed: Jul. 19, 2021

(86) PCT No.: PCT/EP2021/070137
§ 371 (c)(1),
(2) Date: Jan. 17, 2024

(87) PCT Pub. No.: WO2023/001360
PCT Pub. Date: Jan. 26, 2023

(65) Prior Publication Data
US 2024/0332563 A1 Oct. 3, 2024

(51) Int. Cl.
*H01M 8/04089* (2016.01)
*H01M 8/04014* (2016.01)

(52) U.S. Cl.
CPC ... *H01M 8/04097* (2013.01); *H01M 8/04014* (2013.01)

(58) Field of Classification Search
None
See application file for complete search history.

(56) References Cited

U.S. PATENT DOCUMENTS

| | | | | |
|---|---|---|---|---|
| 11,001,915 | B1 * | 5/2021 | Ashary | H01M 8/04074 |
| 2010/0003554 | A1 | 1/2010 | Haushaelter et al. | |
| 2013/0157154 | A1 * | 6/2013 | Hausmann | H01M 8/04097 429/415 |
| 2019/0044165 | A1 * | 2/2019 | Ashary | C09D 1/00 |
| 2020/0168922 | A1 * | 5/2020 | Weingaertner | H01M 8/04761 |
| 2020/0365918 | A1 * | 11/2020 | Magel | F04D 25/16 |
| 2025/0239634 | A1 * | 7/2025 | Rothgang | H01M 8/04097 |

FOREIGN PATENT DOCUMENTS

| | | | |
|---|---|---|---|
| DE | 10 2008 045 170 | A1 | 3/2010 |
| DE | 10 2010 035 860 | A1 | 3/2012 |
| DE | 10 2017 222 390 | A1 | 6/2019 |
| EP | 2 141 761 | A1 | 1/2010 |

* cited by examiner

*Primary Examiner* — Scott J. Chmielecki
(74) *Attorney, Agent, or Firm* — Norman B. Thot

(57) ABSTRACT

A device for an anode gas recirculation in a fuel cell system includes a blower attached to an interface unit. The blower has a blower inlet and outlet, a conveying channel with an inlet and outlet, and a cooling channel partially surrounding an electric motor which extends from an inlet to an outlet. The interface unit has a first anode gas channel extending from a first inlet fluidically connected to a fuel cell outlet to a first outlet connected to the blower's inlet, and a second anode gas channel extending from a second inlet connected to the blower's outlet to a second outlet fluidically connected to a fuel cell inlet. The cooling channel is connected via its inlet to the first outlet or to a third outlet of the interface unit, and/or is connected via its outlet to a third inlet or to the second inlet of the interface unit.

17 Claims, 6 Drawing Sheets

DEVICE FOR ANODE GAS RECIRCULATION IN A FUEL CELL SYSTEM

CROSS REFERENCE TO PRIOR APPLICATIONS

This application is a U.S. National Phase application under 35 U.S.C. § 371 of International Application No. PCT/EP2021/070137, filed on Jul. 19, 2021. The International Application was published in German on Jan. 26, 2023 as WO 2023/001360 A1 under PCT Article 21(2).

FIELD

The present invention relates to a device for anode gas recirculation in a fuel cell system, the device comprising a blower having a blower inlet and a blower outlet, an interface unit having a first anode gas channel which extends from a first inlet fluidically connected to a fuel cell outlet of a fuel cell unit to a first outlet connected to the blower inlet, and a second anode gas channel which extends from a second inlet connected to the blower outlet to a second outlet connected to the blower outlet, to a first outlet connected to the blower inlet, and a second anode gas channel which extends from a second inlet connected to the blower outlet to a second outlet fluidically connected to a fuel cell inlet of the fuel cell unit.

BACKGROUND

Fuel cell systems are used to convert the chemical reaction energy of a continuously supplied fuel, in particular hydrogen and an oxidizing agent, which is usually oxygen, into electrical energy that can be used, for example, as drive energy for vehicles. The hydrogen path of a low-temperature fuel cell, as it is used in vehicles, essentially consists of the supply line of pure hydrogen via a pressure-reducing and metering valve, the actual fuel cell unit, and a recirculation path that connects the outlet of the fuel cell unit with its inlet, i.e., the hydrogen supply line, in a gas-tight manner. The resulting circuit is known as the anode gas recirculation circuit. This anode gas recirculation circuit is necessary to avoid a release of unused hydrogen into the atmosphere which is present because the supply of fresh hydrogen to the fuel cell unit is over-stoichiometric. The anode gas circuit is therefore a closed circuit, and the unused hydrogen is fed back into the supply line downstream of the hydrogen dosing unit via a recirculation blower. Such blowers are, for example, designed as side channel blowers. These blowers are usually driven by electric motors which are supplied with power from the vehicle battery when operating in vehicles. In addition to the unused hydrogen, the recirculated anode gas consists of the components nitrogen, which comes from the fresh air of the fuel cell unit, and water vapor. Liquid product water is also present at the outlet of the fuel cell unit.

The fuel cell unit is usually connected to the anode gas circuit or to the blower for anode gas recirculation via pipes or hoses. It is also known, for example, from DE 10 2017 222 390 A1, to arrange a plate-shaped interface unit between the recirculation blower and the fuel cell unit, via which the anode gas can be conveyed between the blower and the fuel cell unit through corresponding anode gas channels formed in the interface unit without the use of additional hoses and pipes. The connection to the fuel cell unit and the recirculation blower can in this case be made via simple flange connections.

DE 10 2008 045 170 A1 describes providing a cooling heat exchanger in the area of the recirculation blower in order to cool its heat-generating components with the fresh fuel as coolant. Additional lines and pipes must be used to connect the coolant for such a cooling.

SUMMARY

An aspect of the present invention is therefore to provide a device for anode gas recirculation in a fuel cell system that reduces the assembly effort, and which provides a long-lasting tightness of the anode gas circuit. The number of pipes and hoses should thereby accordingly be minimized, thus avoiding errors during assembly.

In an embodiment, the present invention provides a device for an anode gas recirculation in a fuel cell system. The device includes a blower and an interface unit. The blower comprises an electric motor, a blower inlet, a blower outlet, a conveying channel which comprises a conveying channel inlet and a conveying channel outlet, and a cooling channel which at least partially surrounds the electric motor. The cooling channel is arranged to extend from a cooling channel inlet to a cooling channel outlet. The interface unit comprises a first anode gas channel which extends from a first inlet which is fluidically connected to a fuel cell outlet of a fuel cell unit to a first outlet which is connected to the blower inlet, and a second anode gas channel which extends from a second inlet which is connected to the blower outlet to a second outlet which is fluidically connected to a fuel cell inlet of the fuel cell unit. The cooling channel of the blower is at least one of connected via the cooling channel inlet to the first outlet or to a third outlet of the interface unit, and connected via the cooling channel outlet to a third inlet or to the second inlet of the interface unit. The blower is attached to the interface unit.

BRIEF DESCRIPTION OF THE DRAWINGS

The present invention is described in greater detail below on the basis of embodiments and of the drawings in which.

DETAILED DESCRIPTION

Figure 1:
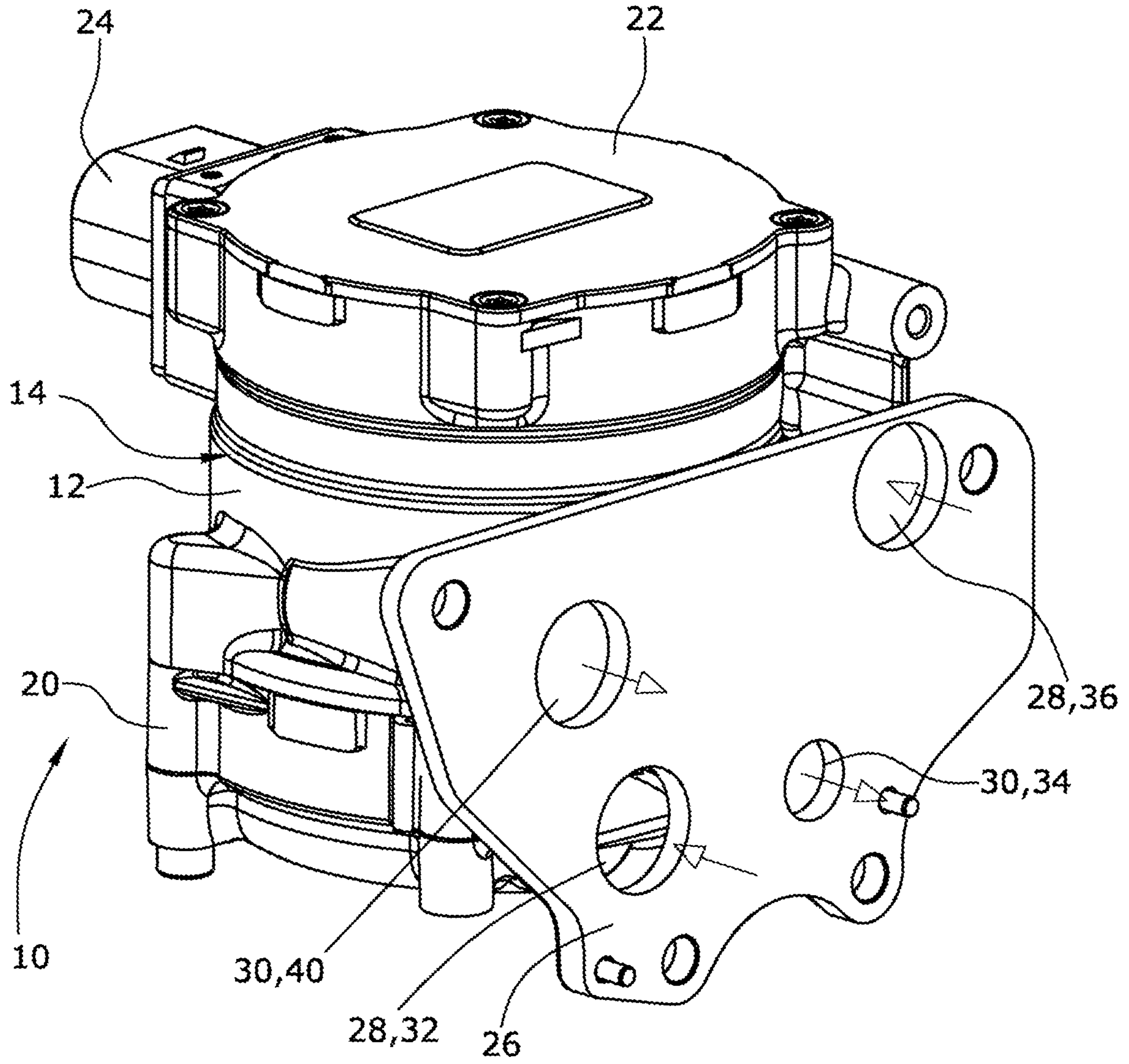
FIG. 1 shows a perspective view of a first embodiment of a blower of a device according to the present invention for anode gas recirculation in a fuel cell system.

The device for anode gas recirculation in a fuel cell system according to the present invention has a blower with a blower inlet and a blower outlet. The anode gas, which consists of nitrogen, hydrogen and water or water vapor, and which flows in via the blower inlet, is conveyed by the blower from the blower inlet to the blower outlet. The blower inlet does not thereby necessarily mean the inlet into a conveying channel; internal upstream channels in the blower, such as coolant inlets, can also form a blower inlet. The device also has an interface unit. This is usually a cuboid or plate-shaped component in which a first anode gas channel is formed, which extends from a first inlet to a first outlet. The first inlet is at least fluidically connected to a fuel cell outlet of a fuel cell unit, whereby a direct mechanical connection of the fuel cell unit to the blower can also be made via the interface unit. The first outlet is connected to the blower inlet, whereby both a cooling channel and a conveying channel of the blower can extend from the blower inlet. A second anode gas channel is furthermore formed in the interface unit, which extends from a second inlet to a second outlet, wherein the second inlet is connected to the blower outlet and the second outlet is fluidically connected to a fuel cell inlet of the fuel cell unit. The fuel cell unit can be connected to the interface unit either directly or via intermediate channels. The blower is arranged directly on the interface unit and the connection is made exclusively via the channels of the interface unit. The blower has a conveying channel with a conveying channel inlet and a conveying channel outlet and a cooling channel that at least partially surrounds an electric motor of the blower so that it is cooled. The conveying channel inlet can form the blower inlet but can also be formed inside the blower. The electric motor in this respect also includes the electronics of the electric motor. The cooling channel extends from a cooling channel inlet to a cooling channel outlet of the blower, whereby the cooling channel inlet and outlet are simply the start and end of the cooling channel, which allow a fluid or gas to flow into or out of a housing part at the corresponding location. The cooling channel is either connected to the first outlet or to a third outlet of the interface unit via the cooling channel inlet and/or connected to a third inlet or to the second inlet of the interface unit via the coolant outlet. There is accordingly either a connection to the anode gas channel, which then serves as a coolant channel, or to a separate coolant channel. The blower is attached to the interface unit so that no further intermediate elements are required. All connections from the interface unit to the blower, including the connections for supplying the blower with coolant, can be made via the interface unit. No need therefore exists to connect pipes or hoses to the blower. The connections of the interface unit must of course be arranged to correspond to the connections on the blower, which makes incorrect installation due to confusion of lines impossible. This also minimizes installation work.

In an embodiment of the present invention, the anode gas can, for example, serve as a coolant and thus serve for conditioning the blower. In addition to the hydrogen, the recirculated anode gas has a water saturation, which causes a high heat capacity and heat conduction, so that a good cooling effect is created.

The interface unit can, for example, have a flange surface in which the first outlet and the second inlet are formed. This means that the connection openings of the blower lie in a common plane. The fluidic connection can thus be created by pushing the flange surface linearly onto or against the corresponding connections of the blower. A durable and tight connection to the blower is created by tightening flange screws.

In an embodiment, the blower can, for example, have a flange which is connected to the flange surface of the interface unit and in which the blower inlet and the blower outlet are formed. The blower inlet is arranged to correspond to the first outlet of the interface unit, and the blower outlet is arranged to correspond to the second inlet of the interface unit, so that by attaching the flange surface to the flange of the blower, both a mechanical attachment of the interface unit to the blower and the creation of the fluidic connections take place in just one assembly step.

The interface unit now also has a third inlet and a third outlet, whereby the third outlet is connected to a cooling channel inlet at the blower, and the third inlet is connected to a cooling channel outlet. There are in this case accordingly two blower inlets and two blower outlets, namely, the coolant inlet and outlet, and the conveyor channel inlet and outlet. This means that the blower is also supplied with a coolant via the interface unit, which flows into the blower or its cooling channel via the interface unit and also flows back into the interface unit from the cooling channel. This means that all connections to the blower, including the connections for supplying the blower with coolant, can be made via the interface unit. Pipes or hoses for connection of the blower can once again be completely eliminated. Incorrect installation is thereby reliably prevented.

The interface unit can, for example, have a flange surface in which the first outlet, the second inlet, the third outlet, and the third inlet, are formed. This means that all connection openings of the blower are in a common plane. The fluidic connection can thus be created by pushing the flange surface linearly onto or against the corresponding connections of the blower. A durable and tight connection to the blower is created by tightening the flange screws.

In a further embodiment of the present invention, the blower can, for example, have a flange which is connected to the flange surface of the interface unit and in which the blower inlet which serves as a conveying channel inlet, the blower outlet which serves as a conveying channel outlet, the cooling channel inlet, and the cooling channel outlet, are each formed. These are of course arranged to correspond to the first outlet, second inlet, third outlet, and third inlet of the interface unit, so that by attaching the flange surface to the flange of the blower, both a mechanical attachment of the interface unit to the blower and the creation of all four fluidic connections are achieved in just one assembly step.

The blower alternatively has a flange which is connected to the flange surface of the interface unit and in which the conveying channel inlet and the conveying channel outlet are formed, and the blower has a cooling channel inlet socket and a cooling channel outlet socket which project into the third outlet and the third inlet of the interface unit. During assembly, the flange surface of the interface unit is thus first pushed over the coolant sockets of the blower, which correspondingly protrudes into the openings of the third inlet and third outlet of the interface unit, until the flange of the blower rests against the flange surface. In this state, the coolant sockets are completely immersed in the third inlet and the third outlet, for example, with a seal in between. All connections between the interface unit and the blower in this configuration are also made in a single assembly step and the blower is attached to the interface unit.

In an embodiment of the present invention, a coolant inlet channel can, for example, be formed in the interface unit, the coolant inlet channel extending from a coolant inlet to the third outlet, and a coolant outlet channel is formed, the coolant outlet channel extending from the third inlet to a coolant outlet. The anode gas channels and the coolant channels of the interface unit are accordingly completely independent of each other so that any coolant can be used.

When the anode gas is used as a coolant, the first anode gas channel can, for example, have a branch so that the first inlet is connected to the first outlet and the third outlet and the second anode gas channel has a branch so that the second inlet and the third inlet are connected to the second outlet. This creates a parallel connection of the cooling channel and the conveying channel of the blower, whereby the two flows are brought together downstream of the blower and flow to the fuel cell unit. The number of connections to the fuel cell unit can thereby be kept to a minimum and assembly can be carried out by simply connecting the flanges. It must, however, be provided that the flow through the cooling channel is also in the correct direction. An additional conveying device may need to be provided for this purpose.

In an alternative embodiment of the present invention, the first anode gas channel can, for example, be connected to the cooling channel inlet via the first outlet, the cooling channel outlet can, for example, be connected to the conveying channel inlet of the blower, and the conveying channel outlet can, for example, be connected to the second anode gas channel via the second inlet. A serial flow through the blower is thereby achieved, whereby the cooling channel of the blower is flowed through first, and then the anode gas from the cooling channel enters the conveying channel and is conveyed back to the fuel cell unit. With such a design, the water can also be separated from the anode gas first and is thus no longer conveyed through the conveying channel. The heating due to the conveying also only takes place after the gas has flowed through the cooling channel.

In an embodiment of the present invention, the cooling channel outlet can, for example, be connected to the conveyor channel inlet via the third inlet, a reverse channel, and the third outlet, in the interface unit, and the second inlet, which is connected to the conveyor channel outlet, can, for example, be connected to the second outlet. The serial connection of the cooling channel to the conveyor channel can thereby be easily established in the interface unit. Further connections can therefore be omitted.

The blower can, for example, have at least one blower head housing in which a conveying channel of the blower is at least partially formed, and a motor housing which at least partially surrounds the electric motor. The electric motor can thereby be mounted with the cooling channel surrounding it, and the impeller can then be mounted on the motor output shaft, whereby the conveying chamber is closed by the blower head housing.

In an embodiment of the present invention, the cooling channel outlet can, for example, be formed in the motor housing, and the conveying channel inlet can, for example, be formed in the blower head housing. The connection can thus easily be made via the interface unit.

The cooling channel outlet can, for example, directly open into the conveyor channel inlet so that no further channels need to be created in the interface unit.

The interface unit can, for example, be formed in one piece with the motor housing or the blower head housing. If the cooling channel inlet and the cooling channel outlet are formed in the flange, no internal connection of the cooling channel to the blower head housing need exist.

The flange of the blower can, for example, be formed on the blower head housing. Production is significantly simpler compared to the design with the motor housing as it is easier to demold.

A device for anode gas recirculation in a fuel cell system is thus created that requires little installation space and which is easy to assemble in just a few steps despite the realization of cooling the drive motor. A high and long-lasting tightness can also be achieved in a simple manner. No need for any pipe or hose connections exists.

Several embodiments according to the present invention are shown in the drawings and are described below.

The blower 10 shown in FIG. 1 has a motor housing 12 in which an electric motor 14 is arranged, which drives an impeller 16, via which an anode gas is conveyed via a conveying channel 18, which is at least partially formed in a blower head housing 20. The motor housing 12 is closed on the axial side opposite the blower head housing 20 by a cover 22 behind which the electronics of the electric motor 14 are arranged, which, like the windings of the stator, are connected to a voltage source via a plug 24.

In the present embodiment, a flange 26 is formed on the blower head housing 20, on which two blower inlets 28 and two blower outlets 30 are formed. The first blower inlet 28 serves as a conveying channel inlet 32, via which hydrogen passes directly into the conveying channel 18, while the first blower outlet 30 serves as a conveying channel outlet 34. The second blower inlet 28 serves as a cooling channel inlet 36, which opens into a cooling channel 38 formed in the motor housing 12 and at least partially surrounds the electric motor 14, which ends at the second blower outlet 30 serving as a cooling channel outlet 40. The cooling channel 38 can accordingly be supplied with a coolant for dissipating heat from the electric motor 14.

Figure 2:
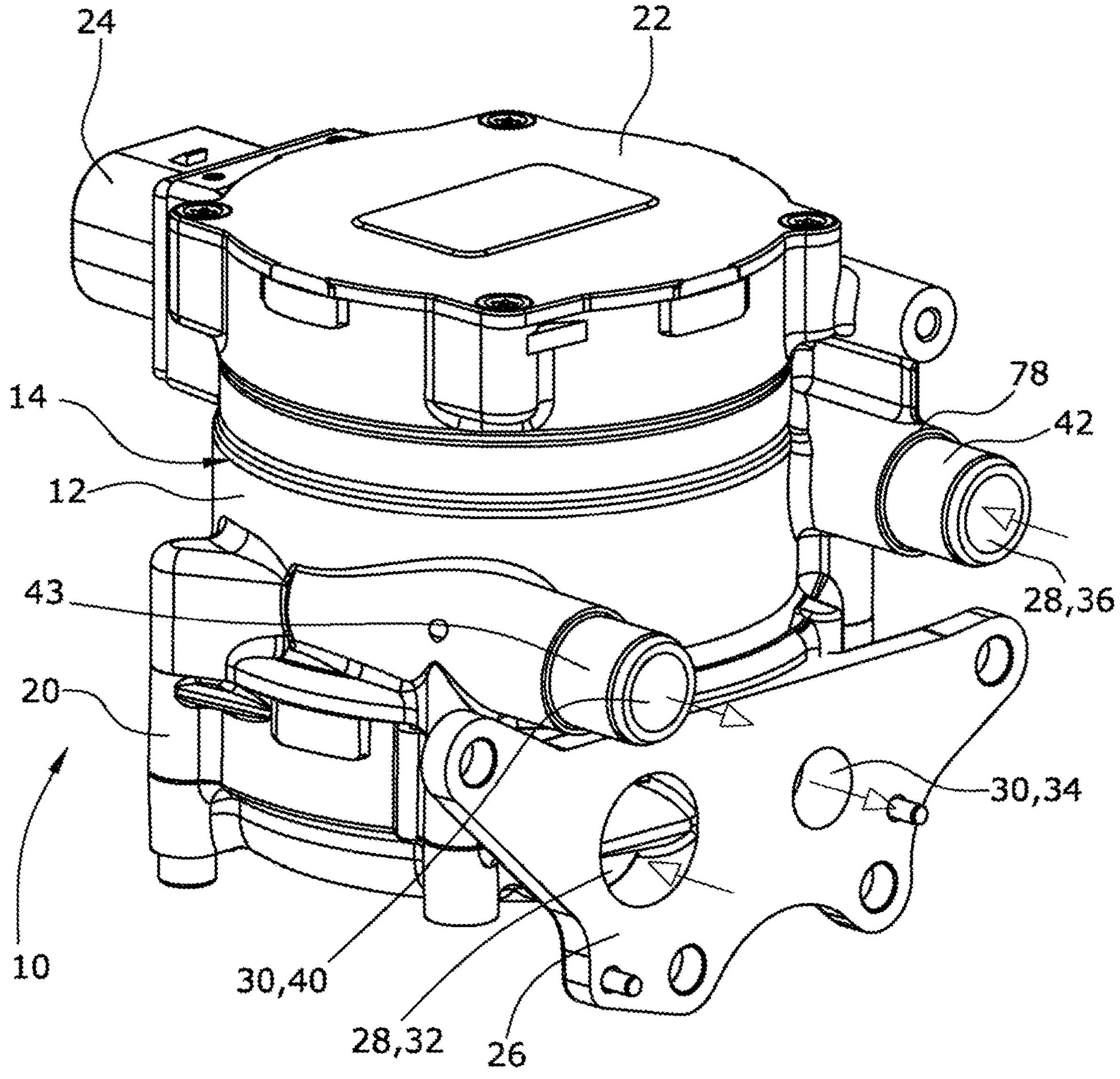
FIG. 2 shows a perspective view of a second embodiment of a blower of a device according to the present invention for anode gas recirculation in a fuel cell system.

In FIG. 2, the cooling channel inlet 36 and the cooling channel outlet 40 are formed as cooling channel inlet connection pieces 42 and cooling channel outlet connection pieces 43, which extend vertically out of the plane of the flange 26 and are formed directly on the engine housing 12.

FIGS. 3 to 6 show embodiments of how such blowers 10 can be integrated into a fuel cell system according to the present invention.

Figure 3:
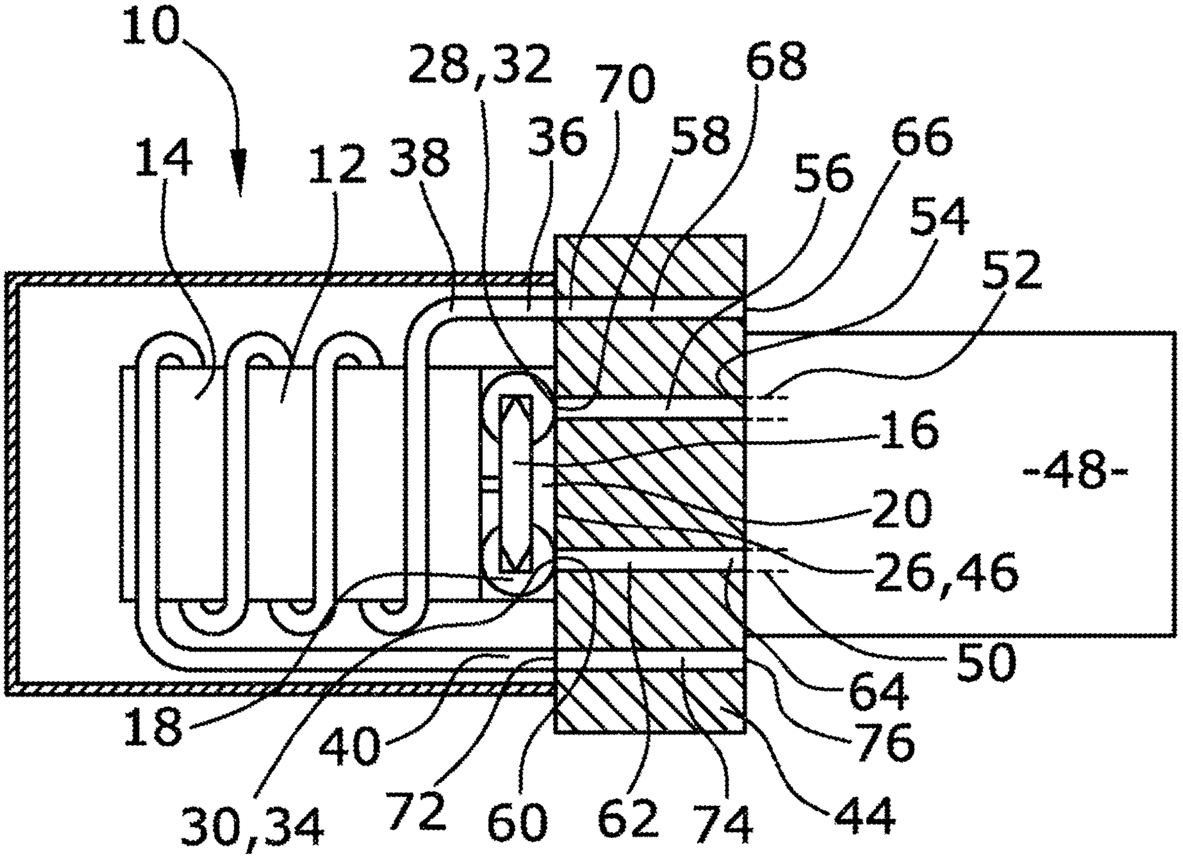
FIG. 3 shows a schematic view of a first device according to the present invention for anode gas recirculation in a fuel cell system.

In the embodiment example according to FIG. 3, an interface unit 44 is connected to the blower 10, which has a flange surface 46 whose hole pattern corresponds to the hole pattern of the flange 26 of the blower 10 according to FIG. 1 or to the hole pattern of the flange 26 and the cooling channel inlet connection piece 42 and the cooling channel outlet connection piece 43 of the blower according to FIG. 2.

A fuel cell unit 48, which has a fuel cell inlet 50 and a fuel cell outlet 52, is attached to the side of the blower 10 opposite the interface unit 44. The fuel cell outlet 52 is connected via a first inlet 54 of the interface unit 44 to a first anode gas channel 56, which extends through the interface unit 44 to a first outlet 58, which is arranged opposite the blower inlet 28 or conveying channel inlet 32, so that the anode gas from the fuel cell unit 48, which contains nitrogen, hydrogen and water vapor, reaches the conveying channel 18, is there compressed, and is conveyed back into the interface unit 44 via the blower outlet 30 or conveying channel outlet 34 via a second inlet 60, which, like the first outlet 58, is formed in the flange surface 46 of the interface unit 44. From the second inlet 60, the anode gas passes into a second anode gas channel 62 which extends through the interface unit 44 and ends in the interface unit 44 at a second outlet 64 which is arranged in a plane with the first inlet 54 and which is connected to the fuel cell inlet 50, so that the anode gas is fed back into the fuel cell unit 48 via the blower 10 without the need for additional lines or pipes.

The interface unit 44 also has a coolant inlet 66, which is connected via a coolant inlet channel 68 to a third outlet 70, which is arranged corresponding to the cooling channel inlet 36 of the blower 10. The coolant accordingly circulates through the cooling channel 38 around the electric motor 14 and exits the blower 10 via the cooling channel outlet 40, which is connected to a third inlet 72 of the interface unit 44, so that the coolant flows via the third inlet 72 into a coolant outlet channel 74 in the interface unit 44, which extends to a coolant outlet 76 through which the coolant can be discharged.

As shown in FIGS. 1 and 2, the cooling channel inlet 36 and the cooling channel outlet 40 can be formed either in the flange 26 or as cooling channel inlet connection piece 42 and cooling channel outlet connection piece 43. While the connection of the inlets and outlets of the blower 10 and the interface unit 44 to each other in the former embodiment is made by screwing the flange surface 46 against the flange 26, in the latter embodiment, the flange surface 46 of the interface unit 44 with its third inlet 72 and third outlet 70 is first pushed over the cooling channel inlet connection piece 42 and the cooling channel outlet connection piece 43 and should be pushed against a stop 78 at the connection pieces 42, 43, which is located in one plane with the flange 26. By interposing a seal, a firm and fluidic connection of the inlets and outlets to each other between the interface unit 44 and the blower 10 can be established by tightening the flange surface 46 on the flange 26.

Figure 4:
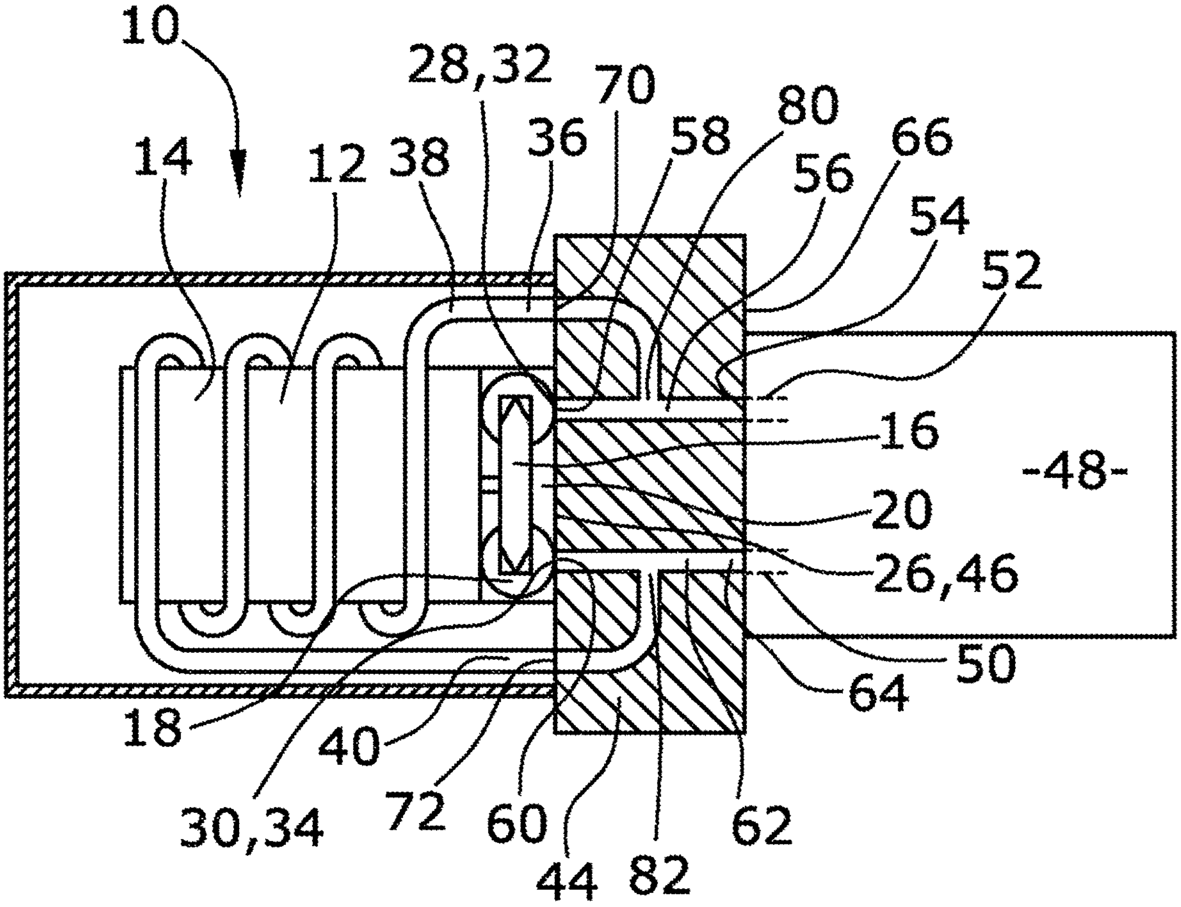
FIG. 4 shows a schematic view of a second device according to the present invention for anode gas recirculation in a fuel cell system.
Figure 5:
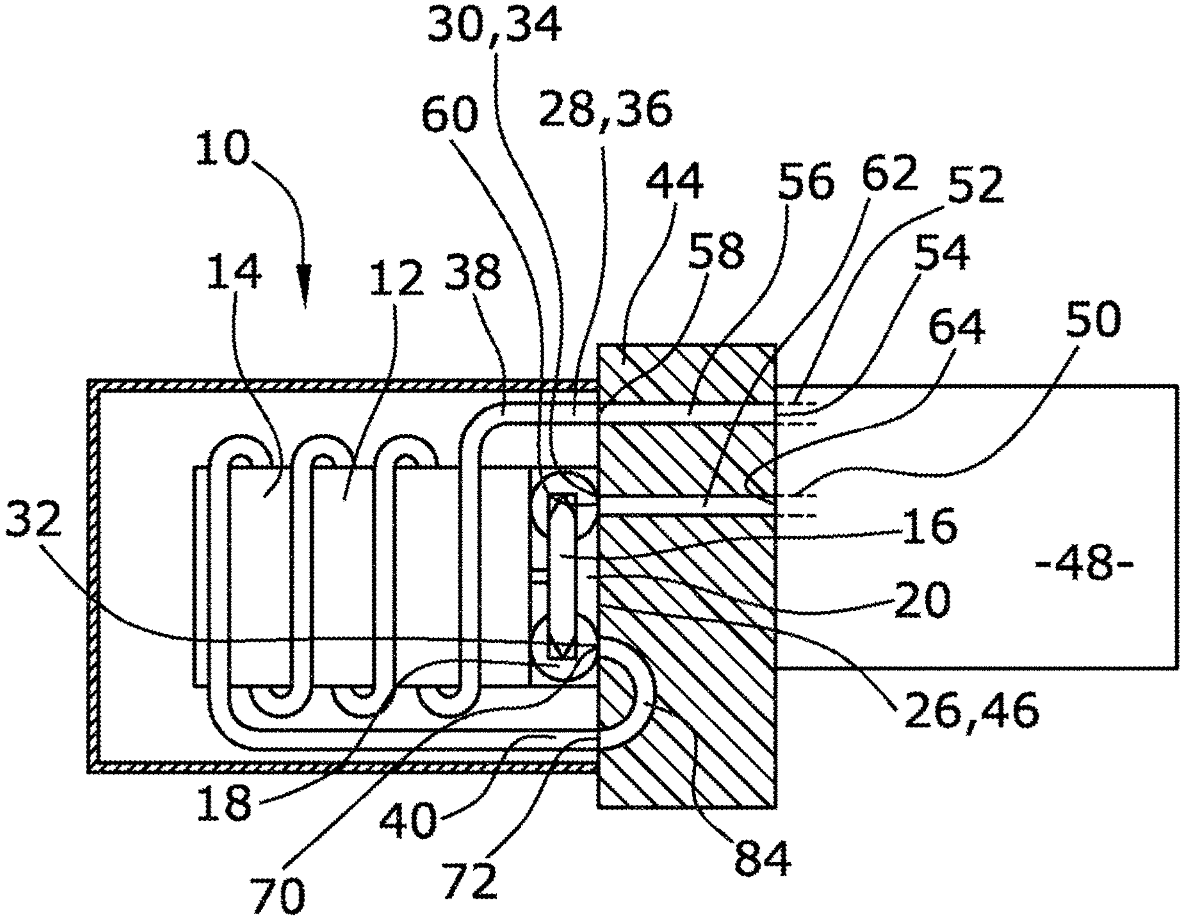
FIG. 5 shows a schematic view of a third device according to the present invention for anode gas recirculation in a fuel cell system.

In addition to known coolants such as glycol or cooling water, the anode gas itself can be used as a coolant. In this embodiment, in addition to the embodiment example already described, a simplification can be achieved, for example, as shown in FIG. 4, via the first anode gas channel 56 and the second anode gas channel 62 each having a branch 80, 82, so that the first inlet 54 of the interface unit 44 is fluidically connected both to the first outlet 58 and to the third outlet 70 and the second outlet 64 of the interface unit 44 is connected to the second inlet 60 and the third inlet 72. The cooling channel 38 and the conveying channel 18 are accordingly connected in parallel by the interface unit 44. If the conveying pressure in the cooling channel 38 is not sufficient due to this parallel connection, an additional conveying unit must of course be provided in the cooling channel 38 in order to provide that the anode gas actually flows in parallel in the cooling channel 38 and in the conveying channel 18.

Figure 6:
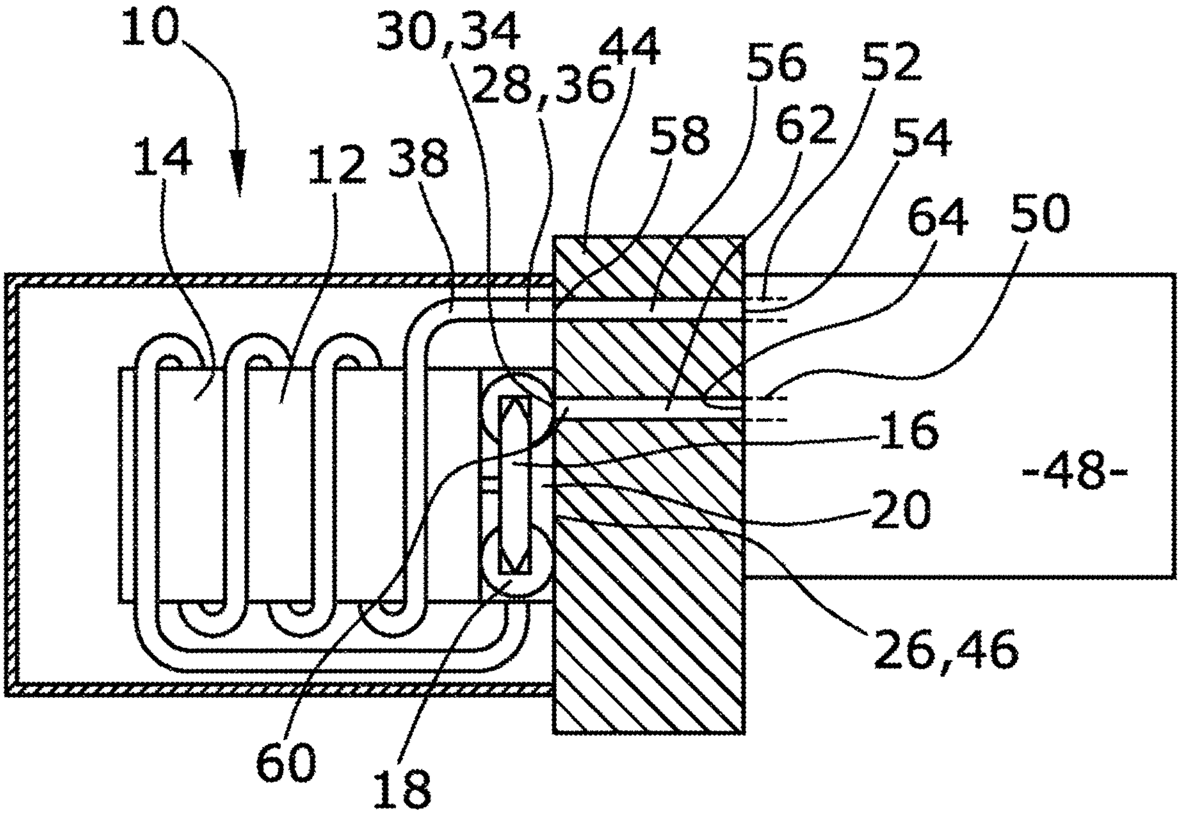
FIG. 6 shows a schematic view of a fourth device according to the present invention for anode gas recirculation in a fuel cell system.

As shown in FIG. 6, it is also possible to connect the cooling channel 38 in series with the conveying channel 18 so that the flow first passes through the cooling channel 38 and then through the conveying channel 18.

The interface unit 44 is then designed so that the first inlet 54 is still connected to the fuel cell outlet 52 and leads into the first anode gas channel 56. This ends at the first outlet 58, which is connected to the blower inlet 28, which in the present embodiment example is formed by the cooling channel inlet 36. The anode gas flows through the cooling channel 38 and reaches the third inlet 72 via the cooling channel outlet 40, which is connected to the third outlet 70 via a reverse channel 84, which is in turn opposite the conveying channel inlet 32 of the blower 10. The anode gas accordingly continues to flow through the conveying channel 18 to the blower outlet 30, which is formed by the conveying channel outlet 34, and from there into the second inlet 60 of the interface unit 44, which is in turn connected via the second anode gas channel 62 to the second outlet 64, which is arranged opposite the fuel cell inlet 50 of the fuel cell unit 48, so that the anode gas is delivered back to the fuel cell unit 48.

It is also possible to realize this serial connection partially within the blower 10 so that only the two anode gas channels 56, 62 are formed in the interface unit 44, as shown in FIG. 6. For this purpose, the anode gas flows into the cooling channel 38 of the blower 10 in the manner already described for FIG. 5. In this embodiment, however, the cooling channel 38 opens directly inside the blower 10 into the conveying channel 18 so that the anode gas otherwise continues to flow downstream of the conveying channel 18 in the manner described for FIG. 5. In this embodiment, the cooling channel inlet 36 can of course also be formed as a cooling channel inlet connection piece 42 via a nozzle, which then projects into the first outlet 58 of the interface unit 44, while the conveying channel outlet 34 is formed on the flange 26 and corresponds to the second inlet 60. The cooling channel inlet 36 can thus be formed on the motor housing 12, and the conveying channel outlet 34 can be formed on the blower head housing 20, which can then be manufactured integrally with the flange 26.

All these designs create devices for anode gas recirculation that are very easy to install and have a high level of tightness over a long service life, as the existing interfaces are reduced by eliminating pipes and hoses. The drive motor of the recirculation blower is additionally cooled in a simple manner, thereby reliably protecting it from overheating.

It should be clear that other channels can also be integrated into the interface unit, such as connections to the hydrogen supply line, control valves or separators.

The present invention is not limited to embodiments described herein; reference should be had to the appended claims.

LIST OF REFERENCE NUMERALS

10 Blower
12 Motor housing
14 Electric motor
16 Impeller
18 Conveying channel
20 Blower head housing
22 Cover
24 Plug
26 Flange
28 Blower inlets/First blower inlet/Second blower inlet
30 Blower outlets/First blower outlet/Second blower outlet
32 Conveying channel inlet
34 Conveying channel outlet
36 Cooling channel inlet
38 Cooling channel
40 Cooling channel outlet
42 Cooling channel inlet connection piece
43 Cooling channel outlet connection piece
44 Interface unit
46 Flag surface
48 Fuel cell unit
50 Fuel cell inlet
52 Fuel cell outlet
54 First inlet
56 First anode gas channel
58 First outlet
60 Second inlet
62 Second anode gas channel
64 Second outlet
66 Coolant inlet
68 Coolant inlet channel
70 Third outlet
72 Third inlet
74 Coolant outlet channel
76 Coolant outlet
78 Stop
80 Branch
82 Branch
84 Reverse channel

What is claimed is:

1. A device for an anode gas recirculation in a fuel cell system, the device comprising:
a blower comprising,
an electric motor,
a blower inlet,
a blower outlet,
a conveying channel which comprises a conveying channel inlet and a conveying channel outlet, and
a cooling channel which at least partially surrounds the electric motor, the cooling channel being arranged to extend from a cooling channel inlet to a cooling channel outlet; and
an interface unit comprising,
a first anode gas channel which extends from a first inlet which is fluidically connected to a fuel cell outlet of a fuel cell unit to a first outlet which is connected to the blower inlet, and
a second anode gas channel which extends from a second inlet which is connected to the blower outlet to a second outlet which is fluidically connected to a fuel cell inlet of the fuel cell unit,
wherein,
the cooling channel of the blower is at least one of connected via the cooling channel inlet to the first outlet or to a third outlet of the interface unit, and connected via the cooling channel outlet to a third inlet or to the second inlet of the interface unit, and
the blower is attached to the interface unit.

2. The device as recited in claim 1, wherein an anode gas of the anode gas recirculation serves as a coolant.

3. The device as recited in claim 1, wherein,
the interface unit further comprises a flange surface, and
the first outlet and the second inlet of the interface unit are formed in the flange surface.

4. The device as recited in claim 3, wherein the first outlet, the second inlet, the third outlet, and the third inlet, are each formed in the flange surface of the interface unit.

5. The device as recited in claim 3, wherein,
the interface unit comprises the third inlet and the third outlet,
the third outlet is connected to the cooling channel inlet, and
the third inlet is connected to the cooling channel outlet.

6. The device as recited in claim 3, wherein,
the blower further comprises a flange,
the flange is connected to the flange surface of the interface unit, and
the blower inlet and the blower outlet of the blower are formed in the flange.

7. The device as recited in claim 6, wherein the conveying channel inlet, the conveying channel outlet, the cooling channel inlet, and the cooling channel outlet, are each formed in the flange of the blower.

8. The device as recited in claim 6, wherein,
the conveying channel inlet and the conveying channel outlet are formed in the flange of the blower, and
the blower further comprises a cooling channel inlet connection piece which is arranged to project into the third outlet of the interface unit and a cooling channel outlet connection piece which is arranged to project into the third inlet of the interface unit.

9. The device as recited in claim 1, wherein,
a coolant inlet channel is formed in the interface unit, the coolant inlet channel being arranged to extend from a coolant inlet to the third outlet, and
a coolant outlet channel is formed in the interface unit, the coolant outlet channel being arranged to extend from the third inlet to a coolant outlet.

10. The device as recited in claim 1, wherein,
the first anode gas channel of the interface unit has a branching so that the first inlet is connected to the first outlet and with the third outlet, and
the second anode gas channel of the interface unit has a branching so that the second inlet and the third inlet are connected to the second outlet.

11. The device as recited in claim 1, wherein,
the first anode gas channel of the interface unit is connected to the cooling channel inlet of the blower via the first outlet,
the cooling channel outlet of the blower is fluidically connected to the conveying channel inlet of the blower, and
the conveying channel outlet of the blower is connected to the second anode gas channel of the interface unit via the second inlet.

12. The device as recited in claim 11, wherein the cooling channel outlet opens directly into the conveyor channel inlet.

13. The device as recited in claim 11, wherein,
the interface unit further comprises a reverse channel,
the cooling channel outlet is connected to the conveyor channel inlet via the third inlet, a reverse channel, and the third outlet in the interface unit, and
the conveyor channel outlet is connected to the second inlet.

14. The device as recited in claim 13, wherein the blower further comprises,
at least one blower head housing in which the conveying channel of the blower is at least partially formed, and
a motor housing which is configured to a least partially surround the electric motor.

15. The device as recited in claim 14, wherein,
the cooling channel outlet is formed in the motor housing, and
the conveying channel inlet is formed in the at least one blower head housing.

16. The device as recited in claim 14, wherein the interface unit is formed in one piece with the motor housing or with the at least one blower head housing.

17. The device as recited in claim 14, wherein the flange of the blower is formed on the at least one blower head housing.

* * * * *